Figure 1:
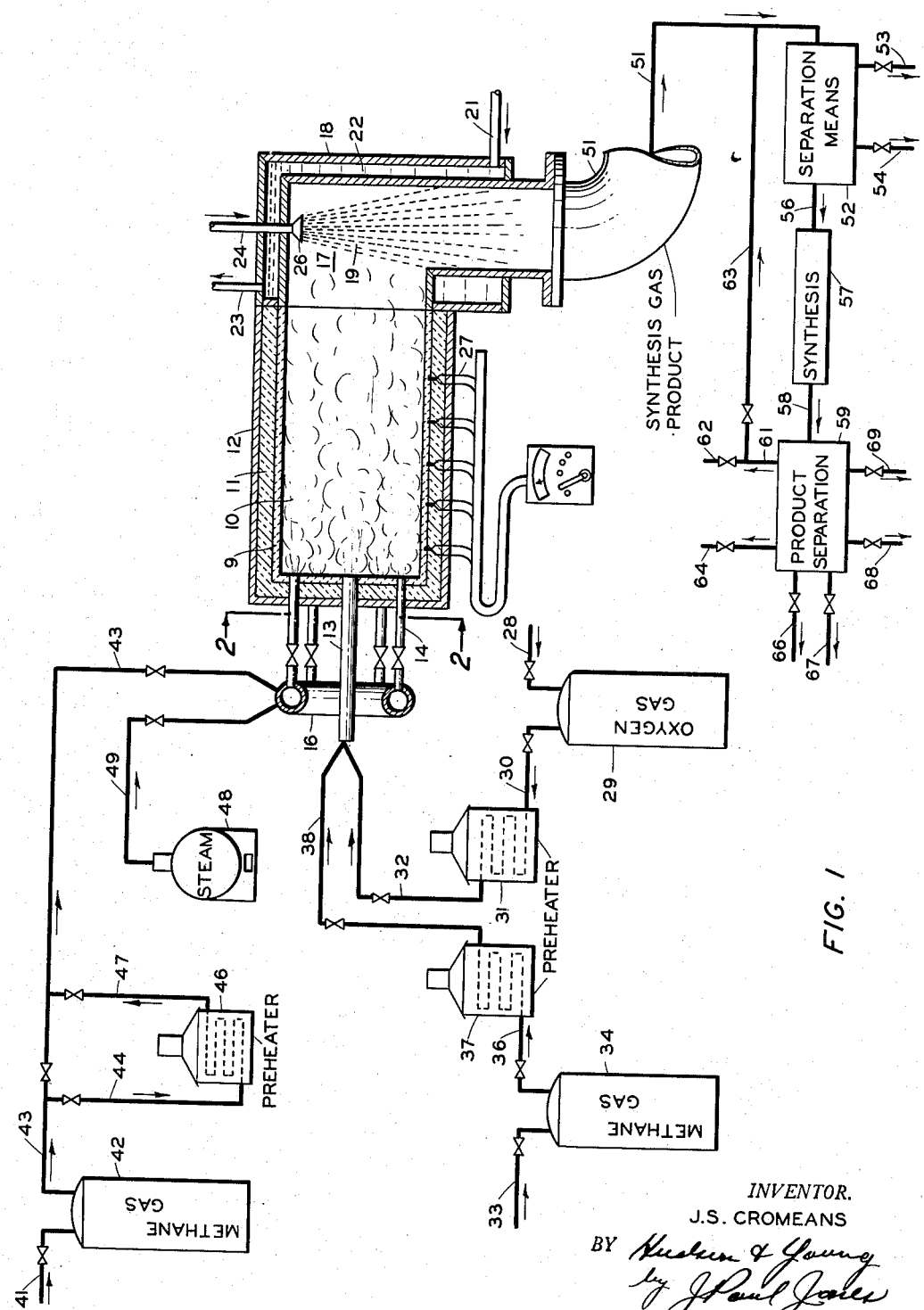

Dec. 29, 1953   J. S. CROMEANS   2,664,402
PROTECTION OF REFRACTORIES IN A REACTION SYSTEM
FROM HIGH TEMPERATURES BY BLANKETING GASES
Filed March 29, 1949   2 Sheets-Sheet 1

INVENTOR.
J.S. CROMEANS
BY
ATTORNEYS

FIG. I

Dec. 29, 1953  J. S. CROMEANS  2,664,402
PROTECTION OF REFRACTORIES IN A REACTION SYSTEM
FROM HIGH TEMPERATURES BY BLANKETING GASES
Filed March 29, 1949  2 Sheets-Sheet 2

INVENTOR.
J.S. CROMEANS
BY
ATTORNEYS

Patented Dec. 29, 1953

2,664,402

UNITED STATES PATENT OFFICE 2,664,402

PROTECTION OF REFRACTORIES IN A REACTION SYSTEM FROM HIGH TEMPERATURES BY BLANKETING GASES

John S. Cromeans, Dewey, Okla., assignor to Phillips Petroleum Company, a corporation of Delaware Application March 29, 1949, Serial No. 84,124

11 Claims. (Cl. 252—373)

This invention relates to the manufacture of hydrocarbons and oxygen-derivatives of hydrocarbons. In one aspect this invention relates to the manufacture of synthesis gas. In another aspect this invention relates to the partial oxidation of a hydrocarbon gas. In another aspect this invention relates to a process for the partial oxidation of a hydrocarbon gas with oxygen to form a hydrogen-carbon monoxide product mixture, wherein refractory reactor equipment ordinarily heated to excessively high temperatures is protected by insulating gases, particularly an endothermically reacting gas mixture.

Carbon monoxide-hydrogen mixtures have utility as feed stocks in various synthesis processes. For example, in a process of the Fischer-Tropsch type, carbon monoxide may be reacted with hydrogen in the presence of a promoted iron catalyst to form hydrocarbons and oxygen derivatives of hydrocarbons. In a process of the oxo type, carbon monoxide and hydrogen add to olefin hydrocarbons usually of higher molecular weight to form aldehydes and alcohols as a chief product. In a process for the manufacture of methanol, carbon monoxide and hydrogen react to produce methanol as the chief product. In a hydrogen manufacturing process a hydrogen and carbon monoxide mixture may be contacted with steam in the presence of an iron catalyst to produce hydrogen and carbon dioxide, and the latter scrubbed from a total product to produce hydrogen in high purity and yield. Such processes as the Fischer-Tropsch, oxo, and methanol synthesis are generally considered to comprise two steps, a "synthesis gas preparation" step and a "synthesis" step.

In the first named step, carbon monoxide and hydrogen may be prepared from a raw carbon-containing material by oxidation with an oxidizing gas, such as carbon dioxide, steam, oxygen, or a mixture of such oxidizing agents. The hydrogen-carbon monoxide product is generally referred to as synthesis gas because it may be prepared in suitable yields and in a suitable mole ratio of hydrogen to carbon monoxide to render it valuable as feed gas for a synthesis step, such as above described; the term "synthesis gas" employed herein refers to such a hydrogen-carbon monoxide mixture.

The oxidation of a hydrocarbon to produce synthesis gas may be illustrated by the following net equations where methane, representing the hydrocarbon, is oxidized by each of the oxidizing agents above mentioned:

(1) $2CH_4 + O_2 = 2CO + 4H_2 + 30,800$ B. t. u.
(2) $CH_4 + H_2O = CO + 3H_2 - 8,700$ B. t. u.
(3) $CH_4 + CO_2 = 2CO + 2H_2 - 106,400$ B. t. u.

Regardless of which hydrocarbon or which oxidizing agent is used, the resulting equilibrium product is a mixture of hydrogen, carbon monoxide, carbon dioxide and steam, together with some small amount of unreacted hydrocarbon. From the standpoint of commercial production of synthesis gas, the partial oxidation process, by which it is meant herein the use of oxygen to maintain an autothermic reaction in accordance with Equation 1 is currently considered by many to offer definite advantages, both process and economic, over other known production methods. The partial oxidation process generally comprises passing preheated oxygen and hydrocarbon gas reactants into a refractory lined combustion zone wherein the mixture is burned at temperatures above 2000° F., preferably in the range of 2350 to 2500° F., to form synthesis gas. Such temperature levels are essential to effect a high hydrocarbon conversion to the equilibrium product mixture and are controlled by the mole ratio of oxygen to hydrocarbon in the hydrocarbon-oxygen feed gas. Operating at such elevated temperatures, refractory materials in the reactor, particularly refractory linings in direct contact with the partial burning, are short-lived, and fail after only a brief period of operation, necessitating expensive shutdowns for repair and replacement of costly refractory reaction equipment.

This invention is concerned with a process wherein a hydrocarbon gas is partially oxidized at temperatures as high as 2500° F., or higher, to produce synthesis gas, and wherein the life of the refractory reactor equipment, ordinarily short lived, is prolonged over long operating periods.

An object of this invention is to provide for the manufacture of hydrocarbons and oxygen derivatives of hydrocarbons.

Another object is to provide a process for the manufacture of synthesis gas.

Another object is to provide a process for the partial oxidation of a hydrocarbon to produce carbon monoxide and hydrogen product mixtures.

Another object is to provide a process for the manufacture of hydrogen and carbon monoxide product mixtures by partial oxidation of a hydrocarbon with oxygen at temperatures as high as 2500° F. and higher.

Another object is to provide a process for the partial oxidation of a hydrocarbon to form hydrogen and carbon monoxide product mixtures wherein refractory equipment ordinarily short-lived at such existing high temperatures, is protected by insulating gas, often an endothermically reacting gas mixture.

Another object is to provide for the partial oxidation of a hydrocarbon with oxygen when utilizing refractory reactor equipment of lower grade and consequently lower cost, than utilized heretofore.

Other objects will be apparent to those skilled in the art, from the accompanying discussion and disclosure.

In accordance with my invention, refractory materials, particularly refractory lining, in a reaction system operated at temperatures higher than those at which optimum life of the refractory is obtained, are insulated by a covering layer of insulating gases, particularly an endothermically reacting gas mixture. My invention is advantageously applied to a process wherein a hydrocarbon gas is partially oxidized by free oxygen to produce hydrogen and carbon monoxide at temperatures in the range of 2,000 to 2,500° F. and higher.

In accordance with one embodiment of my invention, a gaseous hydrocarbon-oxygen mixture is introduced longitudinally into the central portion of an elongated refractory-lined reaction chamber and burned therein in suitable proportions, and at a temperature in the range of 2000 to 2500° F., or higher if desired, to produce carbon monoxide and hydrogen, while at the same time a gaseous hydrocarbon-steam and/or carbon dioxide mixture, is introduced into the refractory lined reaction zone in a manner to cause it to pass through the reaction zone adjacent the reaction chamber walls and to form a covering layer therefor, while reacting to form carbon monoxide and hydrogen. Operating in this manner, a gaseous endothermic reacting mixture blankets the refractory walls of the reactor and cools the refractory lining materials to a temperature from 100 to 300° F. below that of the hydrocarbon-oxygen reaction taking place in the central longitudinal area, whereby refractory materials utilized in the reaction chamber are protected from the peak temperatures of the central exothermic reaction, and are retained in service over long operating periods. The extent of endothermic reaction employed is determined by the amount of cooling required and by the maximum amount of endothermic reaction that can be tolerated while still maintaining the overall reaction exothermic.

I prefer to use oxygen of commercial grade purity which is generally at least 95 per cent. However oxidizing gases containing free oxygen in lower concentrations, may be employed when desired.

I prefer usually to employ a cylindrical elongated reactor, although a reactor of any desired cross sectional shape may be used in the practice of my invention, so long as it is of sufficient length to provide for adequate contact time of the hydrocarbon and oxidizing reactants, which is generally within the range of from 0.01 to 5 seconds, more often from 0.01 to 0.5 seconds.

The protective gas mixture may be introduced into the chamber longitudinally through a plurality of inlets disposed in close proximity to the reaction chamber walls, and spaced about equidistant from each other and from the longitudinal axis of the chamber. In such practice, the inertia of the incoming gases thus introduced maintains a constantly moving protective gas blanket of endothermically reacting gases adjacent the chamber wall.

When employing a cylindrical reaction chamber it is often advantageous to introduce the protective gas mixture into the chamber at a series of points in the upstream portion, in a direction tangent to the inner side wall and perpendicular to a plane determined by the longitudinal axis of the chamber, at a velocity sufficiently high that the gases thus introduced initially follow an inward spiral path, and then move downstream in a helical path adjacent the cylindrical chamber walls. In such practice, centrifugal force of the incoming introduced gases maintains the helically moving protective blanket of endothermically reacting gases adjacent the inner chamber wall.

In the practice of my invention, the protective gas mixture may be introduced in any desired manner, it being essential in any case that the protective gases be introduced into the reaction chamber in such a manner that they are maintained in close proximity to the refractory walls to absorb heat liberated by the exothermic gas reaction taking place in the central portion of the chamber.

Figure 2:
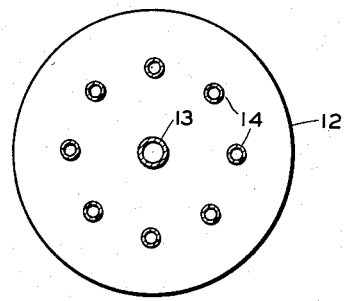
Figure 3:
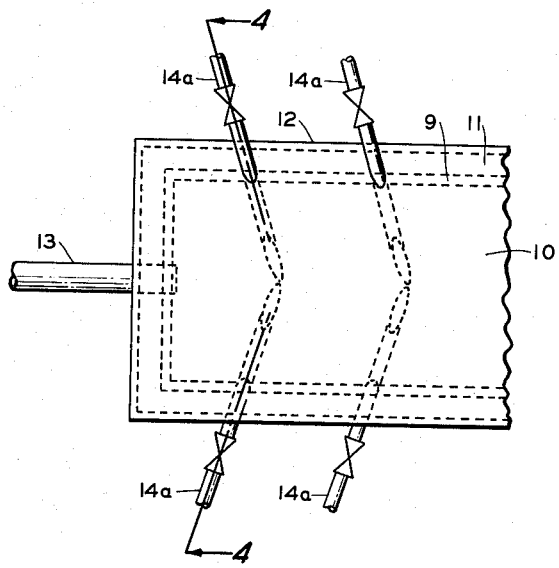
Figure 4:
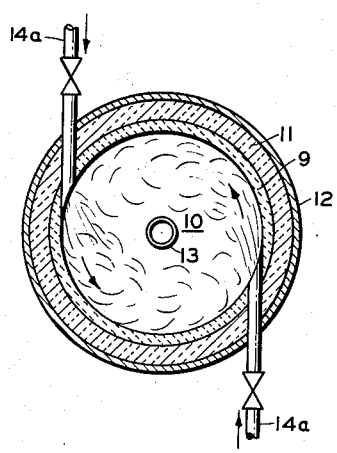

When employing a cylindrical reaction chamber, I prefer the tangential introduction of the protecting gases, although it is to be understood that I obtain extensive protection of reaction chamber walls when the protecting gases are introduced longitudinally. The accompanying figures illustrate preferred embodiments of process and apparatus that may be employed in the practice of my invention. However, it is to be understood that various modifications of the illustrated embodiments may be made and still remain within the scope of my invention. Figure 1 includes a transverse sectional view of a reaction chamber embodying my invention, together with a diagrammatic flow sheet illustrating other apparatus used in the practice of one embodiment of my invention. Figure 2 is a cross sectional view of a portion of Figure 1 taken along line 2—2 looking in the direction indicated. Figure 3 is an elevational view of a portion of another form of reactor embodying the present invention. Figure 4 is a cross sectional view of a portion of Figure 3 taken along line 4—4 looking in the direction indicated.

In the accompanying discussion, reference will be made specifically to the conversion of methane. This is more by way of illustration than of limitation. When it is desired to convert some other hydrocarbon material to a mixture of carbon monoxide and hydrogen, the same procedure can be used and the same principles applied with such adjustment of specific ratios as can be made by any skilled chemist.

Referring to Figure 1, methane passed through line 36 from storage 34 is heated to a temperature of about 1000° F. in preheater 37 and passed through line 38 to central feed inlet 13 and mixed therein with oxygen from line 32 passed from oxygen storage 29 through line 30 and heated in preheater 31 to about 1000° F. Oxygen introduced into inlet 13 from line 32 is preferably of a commercial grade, i. e., from 90 to 95 per cent purity, although other oxygen-containing gases may be used when desired. The mole ratio of oxygen to methane introduced into central inlet 13 is preferably within the limits of 0.62:1 to 0.85:1, although a mole ratio higher than 0.85:1 may be utilized when desired. Methane-oxygen feed is introduced axially into cylindrical reaction chamber 10 through central inlet 13 and burned in chamber 10 at a temperature within the range of 2350 to 2500° F. to form synthesis gas. Cylindrical reaction chamber 10 may be insulated by various means known to the art. Chamber 10 may be lined with a refractory material 9 such as corundum brick or silica brick, although in the practice of my invention a lower grade and consequently less costly refractory material lining may be used, such as ordinary firebrick. Lined chamber 10 is surrounded by a layer of insulating material 11 such as magnesia, and the whole is contained in an outer metal shell 12. The partial burning of reactants from inlet 13 takes place in the central longitudinal portion of reaction chamber 10. Methane passed through line 43 from storage 42 and on through line 44 to preheater 46 is heated in zone 46 to about 1000° F., and resulting preheated methane is passed through lines 47 and 43 to header 16 and admixed therein with steam from steam generation zone 48, passed through line 49. Preheating in any one or all heating zones 37, 31 and 46 may be dispensed with when desired, although preheating is generally preferred in order to effect control of temperatures in zone 10 of a wider range than otherwise possible.

Inlet lines 14 in communication with header 16, admit methane-steam feed from header 16 into zone 10 and are disposed about the outer portions of zone 10 in close proximity to inner wall 9, and are spaced apart about equidistant and preferably on about the same radius from inlet 13. Methane and steam, passed into zone 10 through lines 14 react therein to form carbon monoxide and hydrogen in accordance with Equation 2 above, and the resulting reaction mixture moves in a direction parallel to the longitudinal axis of chamber 10 adjacent the reaction chamber wall, to cover refractory material 9 as a moving protective layer of endothermically reacting gases therefor. Operating in this manner, refractory material 9 is maintained at a temperature from about 100 to 300° F. lower than that of the oxygen-methane reaction taking place in the central longitudinal portion of the chamber, by virtue of the methane-steam reaction utilizing part of the exothermic heat liberated by the reaction of methane with oxygen, as a source of endothermic heat. For example, when conducting the methane-oxygen reaction at a temperature above 2500° F., the wall temperature will generally be in the range of 2300 to 2500° F., dependent on the selected exothermic reaction conditions. In order to maintain the overall synthesis gas reaction exothermic, it is necessary that the mole ratio of methane introduced in the protective gas blanket, to the methane introduced axially with oxygen be not greater than 0.055:1. Steam may be introduced into the reaction chamber in a mole ratio to the total methane introduced through lines 14 of at least 1:1 and within the limits of 1:1 to 1:1.2.

In a specific application of my invention, hot spots which often occur on the reaction chamber wall as a result of operation at temperatures above 2300 to 2500° F. and higher, may be quickly removed by directing an endothermically reacting gas mixture of the type discussed herein to that spot. This may be done as illustrated in Figure 1, by measurement of refractory temperatures by thermocouples 27 to locate such a hot spot, and then by means of valves in each of lines 14 directing any desired portion of the gas mixture in header 16 to the specific area surrounding the hot spot.

Total gaseous effluent is passed from zone 10 at a temperature of from 2350 to 2500° F. and quickly quenched in both direct and indirect heat exchange relation with water to a temperature preferably below about 1000° F., in order to prevent presence of excessively high concentrations of carbon dioxide in the final synthesis gas product, ordinarily resulting from the water gas shift equilibrium illustrated in Equation 4 below:

(4) 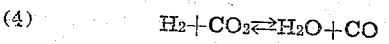

$$H_2 + CO_2 \rightleftharpoons H_2O + CO$$

In accordance with the water gas shift of Equation 4, at temperatures above 1500–2000° F., the product equilibrium shifts to the $CO_2$ side rather rapidly, and thus when the product mixture is cooled too slowly, i. e., by inefficient means, especially in the presence of catalytic materials favoring such a shift as iron or some iron-containing materials, unduly high concentrations of carbon dioxide are obtained in the final synthesis gas product. However, at temperatures below 1000° F., the shift takes place at such a relatively low rate that further rapid cooling is not essential. Thus, to minimize the presence of excessively high concentrations of $CO_2$ in the synthesis gas product, total effluent from zone 10 is rapidly quenched in cooling assembly 17 immediately adjacent zone 10 and consisting of water jacket 18, water spray 19, water inlet conduit 21 to jacket 18, space 22 in which cooling water is passed through jacket 18, water outlet 23 from jacket 18, and water inlet 24, to sprayer nozzle 26.

Total effluent gas from zone 10, recovered from zone 17, contains hydrogen and carbon monoxide in proportions especially suitable for utilization of the effluent gas as synthesis gas. By regulating the mole ratio of methane to oxygen within the limits described herein, in line 13, and by regulating the concentrations of steam and methane introduced into chamber 10 through lines 14, within the limits described herein, gaseous effluent recovered from cooling zone 17 contains hydrogen to carbon monoxide in a mole ratio in the range of 1.7:1 to 2.3:1, which makes this gaseous product especially suitable as synthesis gas for processes of the type discussed earlier in this specification, and especially useful as feed gas to the synthesis step of a Fischer-Tropsch process.

Synthesis gas containing hydrogen to carbon monoxide in a mole ratio of 1.7:1 to 2.3:1 recovered from cooling assembly 17, is conducted through line 51 to separation means 52, wherein any entrained carbon or tarry materials formed in zone 10 are removed. Carbonaceous materials entrained in gas product entering zone 52 and separated therein may be withdrawn through line 53. Steam present in the gas entering zone 52 is removed therein preferably by condensation and withdrawn as water through line 54. Purified synthesis gas is passed from zone 52 through line 56 to a Fischer-Tropsch synthesis step 57, wherein hydrogen and carbon monoxide are reacted in the presence of a catalyst to form hydrocarbons and oxygen derivatives of hydrocarbons.

Any type Fischer-Tropsch catalyst is suitable for use in zone 57 among which may be included iron-type catalysts, cobalt-containing catalysts, and nickel-containing catalysts, either alone or with promoters, usually metallic oxides. Synthesis conditions employed in zone 57 are dependent upon the type catalyst selected. Generally, it is preferable to employ a fluidized iron catalyst either alone or with a promoting material such as a metal oxide, particularly an alkali or an alkaline earth metal oxide as potassium oxide or calcium oxide or mixtures of such promoters. Operating in this manner hydrogen and carbon monoxide from line 56 are reacted in zone 57 in the presence of a fluidized iron catalyst at a temperature in the range of 560 to 620° F., at a space velocity within the limits of 1500 to 3500 standard gas volumes per catalyst volume per hour, and at a pressure within the limits of 5 to 30 atmospheres, to form hydrocarbons and oxygenated hydrocarbons, together with by-product water. Total effluent from zone 57 is passed through line 58 to product separation means 59 comprising storage tanks, fractionation equipment, and the like, not individually illustrated, which are ordinarily employed to separate product fractions contained in the effluent from a Fischer-Tropsch synthesis step. Tail gas comprising carbon dioxide, hydrogen, and some carbon monoxide is withdrawn from zone 59 through lines 61 and 62 or may be recycled through lines 61 and 63 to the Fischer-Tropsch synthesis. Other selected fractions withdrawn from zone 59 may be a normally gaseous hydrocarbon fraction through line 64, a gasoline fraction through line 66, a gas oil fraction through line 67, a heavy wax-like product through line 68 and by-product water through line 69.

In another embodiment of my invention, illustrated in Figures 3 and 4, instead of introducing the endothermically reacting mixture into the reaction chamber as illustrated in Figure 1, i. e., in a direction parallel to the longitudinal axis of the chamber, the gas protective mixture may be introduced into the cylindrical chamber through one or more inlets in the upstream portion of the chamber, being so positioned as to direct the flow of gases in a direction tangent to the cylindrical chamber inner side wall and essentially perpendicular to a plane defined by the longitudinal axis of the cylindrical reaction chamber, the gas so tangentially introduced, being injected at a velocity sufficiently high and in sufficient quantity as to cause the incoming gases to initially follow a spiral inward path and then move downstream in a helical path adjacent the reactor walls to form a helically moving protective gas blanket therefor. In Figure 3 is illustrated cylindrical reaction chamber 10 into which the methane-oxygen reaction mixture is introduced axially through inlet 13 and into which a methane-steam reaction mixture is introduced through inlets 14a in a direction tangent to the inner refractory walls of chamber 10 and perpendicular to a plane determined by the longitudinal axis of the chamber. Dependent upon the size of chamber 10, it may be advantageous to use only one inlet 14a, or more than one. With reference to Figure 4, the formation of the helically moving protective gas blanket is shown in relation to the position of inlet 13, clearly illustrating how the two gas reaction mixtures travel through the reactor, annularly disposed with respect to each other.

Space velocities of reacting gases may be regulated to provide a contact time within the range of reaction times already discussed herein. Operating pressures which may be utilized are those already known in the art as suitable for the partial oxidation of hydrocarbons to form synthesis gas, and are generally in the range from 1 to 30 atmospheres.

In the practice of various embodiments of my invention, two of which I have already discussed and illustrated in detail, reaction conditions, i. e., quenching, contact time, temperature, pressure, reactant mole ratios and the like, may be the same.

My invention provides the added advantage that the mole ratio of hydrogen to carbon monoxide in the final synthesis gas product may be adjusted by virtue of the steam-methane reaction taking place in the protective gas blanket reacting mixture. Steam so added and reacted contributes to a mole ratio of hydrogen to carbon monoxide higher than that obtained by direct oxidation with oxygen alone, in accordance with the illustrated Equation 2.

It is to be understood that steam is not the only oxidizing gas that may be utilized in the practice of my invention as an endothermic reactant. As illustrated in Equation 3 carbon dioxide may be used, especially when it is desired to adjust the mole ratio of hydrogen to carbon monoxide in the final synthesis gas product, to a value below that obtained when methane is oxidized with oxygen alone.

I have illustrated two methods by which an endothermically reacting gas mixture may be utilized to protect the refractory walls in a reaction chamber wherein the chief reaction is highly exothermic, and high temperatures are developed, and especially as applied to a process for the preparation of synthesis gas from methane and oxygen, which reaction is highly exothermic as illustrated by Equation 1 above. It is to be understood that it is within the scope of my invention to apply a moving gas blanket of any type, i. e., chemically reactive or inert, as a means for protecting a chamber wall from unduly high inner chamber temperatures.

As will be evident to those skilled in the art, various modifications of this invention can be made or followed, in the light of the foregoing disclosure and discussion without departing from the spirit and scope of the disclosure or from the scope of the claims.

I claim:

1. A process for the manufacture of synthesis gas comprising introducing methane and oxygen in an oxygen to methane mole ratio within the limits of 0.62:1 to 0.85:1 axially into the central portion of an elongated reaction chamber and therein burning said methane and oxygen to form synthesis gas, introducing steam and methane adjacent the inner walls of said chamber in a steam to methane mole ratio of from 1:1 to 1:1.2 and in a mole ratio of methane to axially introduced methane not higher than 0.055:1, steam and methane so introduced thereby absorbing up to the maximum amount of heat from said burning to react and endothermically form synthesis gas while maintaining exothermic the over-all synthesis gas-forming reaction in said chamber, and recovering synthesis gas from said reaction chamber as a product of the process.

2. The process of claim 1 wherein the temperature of said burning is higher than 2500° F. and the temperature of said chamber inner wall is within the limits of 2300 to 2500° F.

3. The process of claim 1 wherein methane and steam to be reacted endothermically are introduced into said chamber in a longitudinal direction of flow through a plurality of inlets spaced substantially equidistant from the longitudinal axis of said chamber and from each other about a peripheral portion of said chamber.

4. The process of claim 1 wherein methane and steam to be reacted endothermically are introduced into said chamber in a direction tangent to the inner wall of said chamber and perpendicular to a plane determined by the longitudinal axis of said chamber at a velocity sufficiently high to cause methane and steam so introduced to initially follow an inward spiral path and to flow helically downstream adjacent said inner chamber wall.

5. A process for the manufacture of synthesis gas, comprising axially introducing methane and oxygen in a mol ratio of oxygen to methane within the limits of 0.662:1 to 0.85:1 into an elongated cylindrical reaction chamber and therein burning the methane-oxygen so introduced, whereby synthesis gas is formed exothermically, introducing steam and methane into said chamber as an annulus adjacent the walls of said chamber and intermediate said wall and the burning of said axially introduced methane and oxygen, in a steam to methane mol ratio within the limits of 1:1 to 1:1.2 and in a mol ratio of methane to axially introduced methane not higher than 0.055:1, methane and steam so introduced thereby absorbing up to the maximum amount of heat from said burning to react and endothermically form synthesis gas while maintaining exothermic the over-all synthesis gas-forming reaction in said chamber, and recovering synthesis gas from said reaction chamber as product of the process.

6. The process of claim 3, wherein said mixture of methane and steam to be reacted endothermically is introduced into said reaction chamber through at least one of said inlets in a predetermined amount greater than that introduced through any remaining of said inlets.

7. A process for the manufacture of synthesis gas, comprising introducing a hydrocarbon gas and free oxygen in proportions for exothermically reacting with each other to form synthesis gas, into the central portion of an elongated cylindrical reaction chamber in a direction of longitudinal flow and exothermically reacting said hydrocarbon with said oxygen in said central portion to form synthesis gas; introducing a hydrocarbon gas and an oxidizing gas of the endothermically reacting type, in proportions for reacting with each other to form synthesis gas, longitudinally into said reaction chamber adjacent the inner wall of said chamber and intermediate said wall and said central portion, through a plurality of inlets spaced from the longitudinal axis of said chamber about a peripheral portion thereof; hydrocarbon and said oxidizing gas introduced through said plurality of inlets absorbing heat from said exothermic reaction and reacting with each other to form synthesis gas; continuously detecting the inner wall temperature of said elongated cylindrical reaction chamber and when said inner wall becomes locally overheated introducing hydrocarbon and said oxidizing gas through one of said plurality of inlets in direct contact with the locally overheated portion of said inner wall in an increased amount, whereby an increased proportion of hydrocarbon and said oxidizing gas contacts said overheated wall portion and interreacts endothermically to absorb heat at an increased rate to accelerate cooling of said overheated wall portion, and recovering synthesis gas from said reaction chamber as product of the process.

8. A process for the production of synthesis gas, comprising introducing a hydrocarbon gas and oxygen in proportions for exothermically reacting with each other to form synthesis gas, into the central portion of an elongated reaction chamber in a direction of longitudinal flow, and exothermically reacting said hydrocarbon and oxygen therein to form said synthesis gas; cooling the walls of said chamber to a temperature lower than that of said exothermic reaction by introducing a hydrocarbon gas together with an oxidizing gas of an endothermically reacting type into said chamber adjacent the walls thereof and intermediate said walls and said exothermically reacting gases in said central portion in relative proportions and amounts to absorb up to the maximum amount of heat from said exothermic reaction that can be tolerated so as to react and endothermically form synthesis gas while still maintaining the over-all synthesis gas-forming reaction in said chamber exothermic, and recovering as product of the process, from said chamber, synthesis gas constituted of product of said endothermic and exothermic reactions.

9. The process of claim 8 wherein said endothermically reacting oxidizing gas is steam and is introduced together with endothermically reacting hydrocarbon into said reaction chamber disposed annularly about said exothermic reacting gases therein.

10. The process of claim 8 wherein said endothermically reacting oxidizing gas is steam and is introduced together with endothermically reacting hydrocarbon into said chamber, in a direction of longitudinal flow adjacent the inner wall of said chamber and intermediate said wall and said exothermically reacting gases therein.

11. The process of claim 8 wherein said reaction chamber is cylindrical, and wherein said endothermically reacting oxidizing gas is steam and is introduced together with endothermically reacting hydrocarbon gas into said chamber in a direction tangent to the inner surface of the chamber wall at a velocity sufficiently high that gas thus tangentially introduced initially follows a spiral path and forms a helically-moving gas blanket adjacent the inner wall of said chamber.

JOHN S. CROMEANS.

References Cited in the file of this patent

UNITED STATES PATENTS

| Number | Name | Date |
|---|---|---|
| 858,640 | Welles | July 2, 1907 |
| 1,618,808 | Burg | Feb. 22, 1927 |
| 1,743,930 | Nielsen et al. | Jan. 14, 1930 |
| 1,963,167 | Heller | June 19, 1934 |
| 2,002,863 | Nagel | May 28, 1935 |
| 2,047,870 | Hillhouse | July 14, 1936 |
| 2,126,150 | Stryker | Aug. 9, 1938 |
| 2,220,357 | Steinschlager | Nov. 5, 1940 |
| 2,302,156 | Totzek | Nov. 17, 1942 |
| 2,347,682 | Gunness | May 2, 1944 |
| 2,486,879 | Rees et al. | Nov. 1, 1949 |
| 2,572,829 | Atkinson | Oct. 30, 1951 |

FOREIGN PATENTS

| Number | Country | Date |
|---|---|---|
| 413,130 | Great Britain | July 12, 1934 |